United States Patent [19]

Azarniouch

[11] 4,391,671

[45] Jul. 5, 1983

[54] METHOD OF PRODUCING LIME IN A ROTARY KILN

[75] Inventor: Mahmoud K. Azarniouch, Montreal West, Canada

[73] Assignee: Pulp and Paper Research Institute of Canada, Pointe Claire, Canada

[21] Appl. No.: 267,504

[22] Filed: May 27, 1981

[51] Int. Cl.³ .............................................. C01F 11/06
[52] U.S. Cl. ................................ 162/30.1; 162/30.11; 423/155; 423/175; 423/636; 423/637
[58] Field of Search ............... 423/175, 177, 637, 155, 423/636; 162/30.1, 30.11

[56] References Cited

U.S. PATENT DOCUMENTS 2,171,507  8/1939  Newhouse .......................... 423/175
3,112,101  11/1963  Levenberger ...................... 423/177

FOREIGN PATENT DOCUMENTS 54-14400  2/1979  Japan .................................. 423/442

OTHER PUBLICATIONS

Victor J. Azbe, Rock Products, (Jun. 1942), p. 314.
Boynton, Chemistry and Technology of Lime and Limestone, Interscience Publishers, (1966), pp. 246-253.

Primary Examiner—O. R. Vertiz
Assistant Examiner—Wayne A. Langel
Attorney, Agent, or Firm—Lawrence I. Field

[57] ABSTRACT

Biomass residue is added at the cold end of a rotary calcination kiln to generate heat in situ thereby diminishing substantially the amount of fossil fuel normally fired at the hot end of the kiln.

5 Claims, 1 Drawing Figure

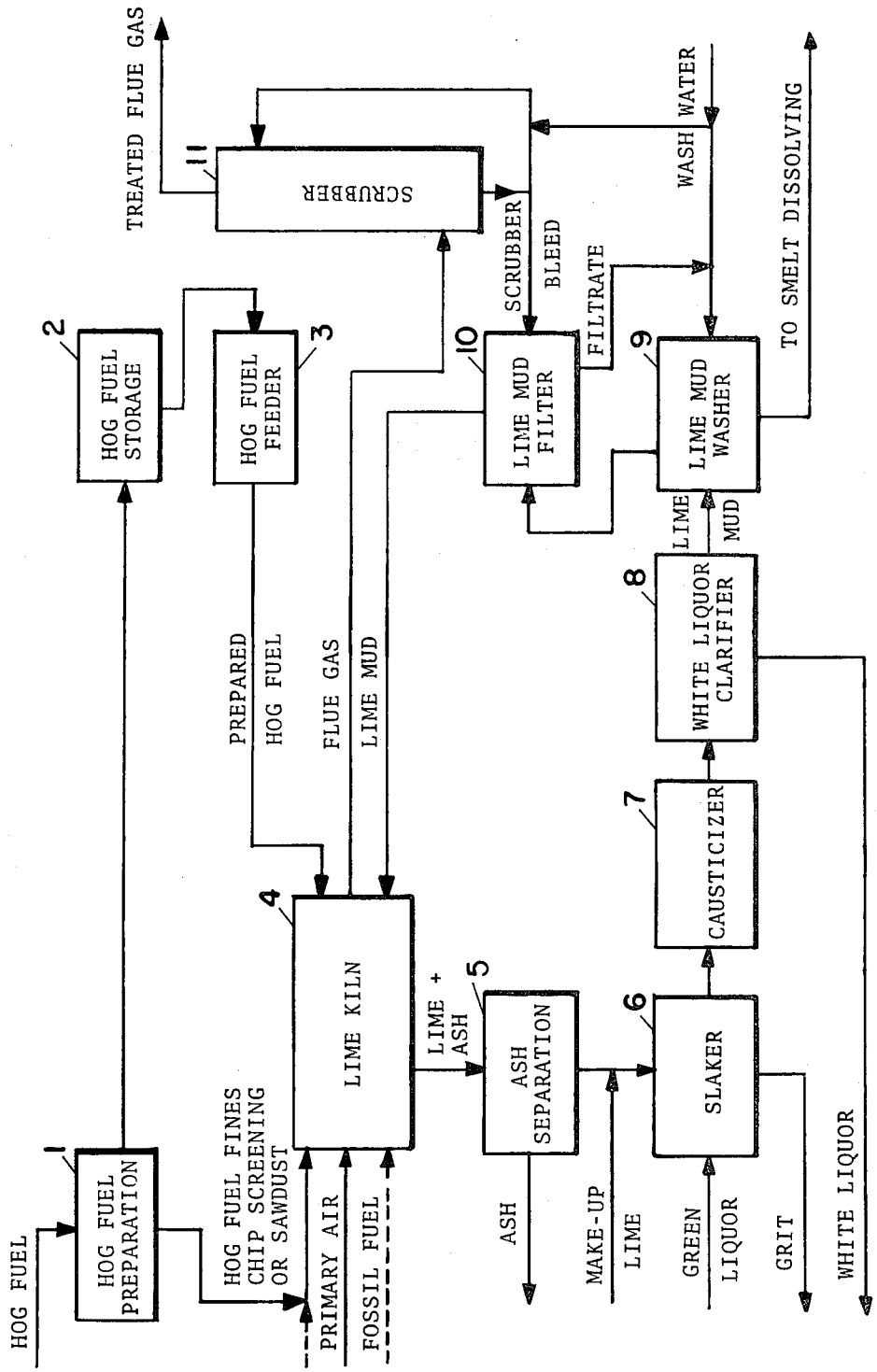

METHOD OF PRODUCING LIME IN A ROTARY KILN

BACKGROUND OF THE INVENTION

This invention relates to an improved process for calcining calcium carbonate ($CaCO_3$) in a rotary kiln to obtain calcium oxide (CaO).

In the manufacture of paper by the Kraft and other alkaline pulping processes wood chips are cooked with a solution of sodium hydroxide, sodium sulphide, and other chemicals depending on the grade and kinds of pulp desired and the spent liquor after it has been separated from the pulp is processed to recover values therein. At some stage of the process the spent materials being treated are causticized with lime usually with resultant recipitation of calcium carbonate.

In order to improve the economics of the process the calcium carbonate is recovered and is subsequently calcined in a kiln to produce calcium oxide which may then be reused to causticize additional spent liquor. Naturally occurring limestone is also calcined to produce calcium oxide for a variety of known commercial uses.

There are two types of calcination kilns in general use. In the vertical shaft kiln coarse lime rock is mixed with solid fuel or, layered alternately and calcined to produce lime. Fine sized stone and fuel cannot be used since they would create too much resistance to the upward flow of combustion and reaction gas ($CO_2$). The relative position of the limestone and fuel does not change during the descent of the charge in the kiln thus permitting a variety of solid fuels. Coal as well as wood has been used as fuel in the vertical shaft kilns. The vertical kiln is not suitable for the calcination of lime mud produced during causticization of spent materials in the pulping process due to the fineness of the mud.

The rotary kiln is especially suited for calcining finely powdered $CaCO_3$ such as lime mud from the causticizing process. Hitherto the fuel used to supply the heat required to convert the mud to CaO has been exclusively natural gas, oil or powdered coal fired from the hot product discharge end of the rotary kiln.

U.S. Pat. No. 1,323,294 to R. W. Lesley relates to the use of low grade coal, oil shale or lignite in a cement calcination process employing a rotary kiln. The low grade material is gasified externally in separate retorts to obtain fuel gas and chemical values. The evolved gases are used to supplement or reduce the fuel conventionally fired from the product discharge end of the kiln. The gasification residue is mixed with the raw cement clinker. The fine carbonaceous part of the residue which has a heating value is burnt during calcination.

U.S. Pat. No. 4,022,629 to Garrett et al is directed to the manufacture of cement clinker in a rotary kiln. Combustion of a residual fuel is effected directly in the bed of the kiln to reduce the normal fuel requirement. Representative types of residual fuels are coke, coal, char, coal gasification residue or mixtures thereof. The chosen fuel must have a high heat value (over 10,000 BTU/lb), a maximum particle size of less than one quarter of an inch, (preferably between 8 and 325 U.S. screen mesh size) and a high ash and sulphur content. Neither the ash nor the sulphur content of the above fuels can be tolerated in a kraft mill lime kiln.

I have discovered biomass material to be an inexpensive yet suitable fuel in the calcination of lime mud originating from the causticizing operations of an alkaline wood-pulping process such as kraft or soda.

The biomass material may comprise wood residues incidental to the wood chip production at a pulp manufacturing facility, or other woody residues, hog fuel, bark, sludges, agricultural residues and the like, provided it does not contain large amounts of sulfur or other elements which would adversely affect the use of the calcium oxide in the causticizing operation for which it is intended.

The use of a low grade biomass fuel when combusted directly in the bed of a rotary kiln provides a substantial portion of the required process heat thereby reducing the need for more expensive natural gas, oil or powdered coal fired in the hot produce discharge end of the kiln.

It is a primary object of the invention to provide an economical method of calcining lime mud or lime stone in a rotary kiln using a low grade material as the fuel to provide a substantial portion of the heat required for calcination. A second object is to provide a low grade, relatively sulphur-free, fuel material which will not affect the normal operation of the kiln. Another object is to recover the lime product from the kiln and utilize it to causticize a wood pulping liquor. A further object is to recover the heat values of any char and/or volatile organic material escaping with the combustion gases from the kiln for further combustion in the kiln. Other objects will be apparent to those skilled in the art.

SUMMARY OF THE INVENTION

According to this invention there is provided in a method for calcining lime mud or lime stone in a rotary kiln fired at the hot end by burning fossil fuel, an improvement which comprises adding to the lime mud or lime stone at the cold end an amount of biomass residue which is combusted in the kiln to generate heat in situ, said amount being sufficient for effecting calcination and effective enough to substantially diminish the amount of fossil fuel normally fired.

DETAILED DISCUSSION

In the process of the present invention coarse, low cost residues in the form of wood residues, hog fuel, bark, sludges, agriculture residues, etc., are fed directly into the cold end of the rotary kiln with the lime mud. After thorough preheating of the kiln with fossil fuel at the hot end, stable combustion of the coarse biomass residue can be maintained throughout the calcination zone. Thusly maintained, the amount of fossil fuel can then be substantially diminished to effect fuel economy.

Coarse woody residues up to several inches in size, having moisture contents of up to 60% and a low heat value of about 3,500 to 8,000 BTU/lb depending on the actual moisture content can be burned despite the inhomogenous mixture with fine lime mud, to provide a substantial portion of the fuel requirements. A 95+% conversion into CaO can be maintained producing a product of acceptable quality.

Preparation of the biomass residue prior to burning may be practiced optionally. Such preparation may include any one of the following steps or combinations thereof: (a) separation of the fines; (b) comminution to an appropriate size; and (c) pressing or drying to a desirable moisture content.

In attaining one objective of this invention, namely near-complete replacement of fossil fuel, a combination of direct in-situ combustion of biomass residues charged with lime into the cold end of the kiln, and hot end combustion of woody fines (from screening and/or any other source) introduced with the primary air into the existing oil or natural gas flame in a mixed fuel burner is used. Alternatively, two separate burners can be used, one for the fossil fuel and the other for the biomass fines.

Any unburnt fines, tars and volatile components of the biomass residue in the kiln, carried over with the flue gas, is first directed to a scrubber and then routed to the lime mud filter where it is mixed with the dewatered lime mud for recycle burning in the kiln.

The invention will be more fully understood from the description which follows taken in conjunction with the drawing. The drawing is a schematic flow diagram showing part of a Kraft pulping chemicals recovery process employing the present invention. The invention can also be applied to the soda process or to other processes in which it is desired to produce CaO from $CaCO_3$.

As shown in the drawing, unprocessed woody residue, referred to as hog fuel in the drawing, is conveyed to a fuel preparation unit 10. In general, the hog fuel requires little or no preparation in terms of comminution or pre-drying. Hog fuel of very inhomogeneous size distribution and high moisture content can be introduced into the cold feed end of the kiln and burned in-situ with the lime stone. However, in order to obtain a more stable combustion, it is often advantageous to separate the hog fuel fines before feeding the coarse particles into the cold end of kiln 14 and under certain circumstances, it is advantageous to reduce the moisture of the hog fuel. Comminution may also be required if size distribution of the wood waste is too inhomogeneous and presents difficulties in feeding and transporting the wood waste particles in the kiln. Hence the hog fuel preparation 10 may include all or any combination of (a) screening or any other suitable means to separate the fines, (b) comminution, and (c) moisture reduction. The prepared hog fuel is then passed into a storage bin 12 from which it is fed into the cold end of kiln 14 by means of a suitable feeder 13 which may be the pusher type, the screw type, or any other suitable form.

In attaining near complete replacement of fossil fuel, the hog fuel fines, separated in the hog fuel preparation 10, can be supplemented with chip screenings or sawdust and directly injected from the hot product end of kiln 14 along with the primary air into an existing oil or natural gas flame in a mixed fuel burner, or, alternatively, may be burned in a separate burner directed into the hot end of kiln 14, or both may be used.

The product lime as well as ash and any other inert inorganic material introduced with the hog fuel are discharged from the kiln 14 at the hot product end thereof. In order to prevent an accumulation of ash and inerts in the chemicals recovery cycle of the pulping process, the lime must be separated from ash and inerts. This separation is accomplished in an ash separation unit 15. The product lime is discharged from the kiln substantially in the form of pellets of ⅛ inch to ½ inch in diameter and can be different in size and density from the ash and inorganic inerts. Hence the product lime may be separated from the ash by using a screen, cyclone or centrifuge. Any other suitable form of physical separation may be used to accomplish this.

After the ash separation step, make-up lime is added to the product lime and passed to a slaker 16. Some residual ash and inerts are removed with the grit from the slaker 16. Green liquor is added to the slaker 16 and passed to a causticizer 17 in which the green liquor is causticized to a white liquor. The white liquor is then passed to clarifier 18, where the lime mud, largely free of ash and inerts, is separated from the white liquor. The lime is then conveyed to a lime mud washer 19. The lime mud, after washing, is fed to a filter 20 which yields a final mud product of about 70 percent solids. Volatile organic decomposition products or unburned char contained in the flue gas issuing from the lime kiln 14 can be recycled into the lime kiln 14 by passing the bleed of the lime kiln scrubber 21 into lime mud filter unit 20. The filtrate from lime mud filter 20 may be diluted with wash water and utilized in the lime mud washer 19.

In order to illustrate the invention described in the present disclosure, a few tests were carried out with a pilot scale lime kiln (16 inches i.d., 18 feet long). The tests in which wood fed from the cold end of the kiln was used to supplement natural gas are summarized in the Table below.

| Run No. | Stone kg/h | Wood kg/h | Air m³/min | Natural Gas m³/min | Percent Calcination | Rot'l Speed rpm |
| --- | --- | --- | --- | --- | --- | --- |
| 1 | 50 | 7 | 1.642 | 0.159 | 92.5 | 1.5 |
| 2 | 50 | 0 | 1.642 | 0.170 | 98.2 | 1.5 |
| 3 | 10 | 34 | 1.076 | 0.057 | 98.8 | 3.0 |
| 4 | 10 | 0 | 0.991 | 0.099 | 99.7 | 3.0 |

In all tests, dry calcium carbonate stone, 0.1 to 0.3 cm in size, was used. In Run 1, screened chips fines were used, while in Run 3, chips were used as the wood supply. In both cases, the wood was fed as is, i.e. non-pre-dried and with a moisture content of 45–50% on wet basis. It can be seen that in Run 1 and Run 3 approximately 6.5% and 42.5% respectively, of natural gas was replaced by wood.

Although this invention has been described in its preferred form and preferred practice with a certain degree of particularity, it is understood that the present disclosure of the preferred form and preferred practice has been made only be way of example and that numerous changes in the details of the combination and arrangement of parts and steps may be resorted to without departing from the spirit and the scope of the invention as hereinafter claimed.

What is claimed is:

1. In a method of calcining lime mud or lime stone in a rotating kiln in which the lime mud or lime stone is fed into the cold end of said kiln and is calcined by the heat produced by burning fossil fuel at the hot end of said kiln, the improvement which comprises: preparation of biomass residues to produce a biomass residue substantially free from fines and suitable for feeding into said kiln; feeding said prepared biomass residues into the cold end of said kiln, along with the material to be calcined; combusting said residues in said kiln, generating heat in situ in said kiln, whereby the amount of fossil fuel burned to calcine said material is diminished.

2. The process of claim 1 wherein said residues are selected from the group consisting of hog fuel, bark, wood waste, sludges, agricultural residues, and other combustible biomass residues, and mixtures thereof.

3. The process of claim 1 including separation of the coarser residues from the finer residues, before feeding said residues into said kiln and burning the separated finer residues at the hot end of said kiln.

4. The process of claim 1 or claim 3 including the additional step of recovering in a scrubber, char and volatile organic products escaping with combustion gases from the kiln and, recycling said products back to the kiln for further combustion.

5. The process of claim 1 or claim 3 including in addition recovering the calcine from said kiln, separating ash and other contaminants therefrom and utilizing the product lime to causticize a wood pulping liquor.

* * * * *